United States Patent
Stuart et al.

(10) Patent No.: US 6,723,672 B1
(45) Date of Patent: Apr. 20, 2004

(54) HIGH-STRENGTH MAGNESIA PARTIALLY STABILIZED ZIRCONIA

(75) Inventors: Martin D. Stuart, Melbourne (AU); Wilson H. Ta, Melbourne (AU)

(73) Assignee: Carpenter Advanced Ceramics, Inc., Auburn, CA (US)

( * ) Notice: Subject to any disclaimer, the term of this patent is extended or adjusted under 35 U.S.C. 154(b) by 0 days.

(21) Appl. No.: 09/889,548

(22) PCT Filed: Jan. 24, 2000

(86) PCT No.: PCT/US00/01804

§ 371 (c)(1), (2), (4) Date: Jul. 17, 2001

(87) PCT Pub. No.: WO00/43327

PCT Pub. Date: Jul. 27, 2000

Related U.S. Application Data

(60) Provisional application No. 60/117,250, filed on Jan. 26, 1999.

(51) Int. Cl.$^7$ .............................................. C04B 35/488
(52) U.S. Cl. ..................... 501/104; 501/105; 264/681
(58) Field of Search ................................. 501/104, 105; 264/681

(56) References Cited

U.S. PATENT DOCUMENTS

| | | | |
|---|---|---|---|
| 4,279,655 A | | 7/1981 | Garvie et al. |
| 4,506,024 A | | 3/1985 | Claussen et al. |
| 4,587,225 A | | 5/1986 | Tsukuma et al. |
| 4,626,517 A | * | 12/1986 | Watanabe et al. ............ 501/103 |
| 4,814,915 A | * | 3/1989 | Wada et al. ................. 501/104 |
| 4,885,266 A | | 12/1989 | Hughan et al. |
| 4,900,492 A | | 2/1990 | Claussen et al. |
| 4,975,397 A | * | 12/1990 | Dworak et al. ............. 501/104 |
| 5,432,016 A | * | 7/1995 | Wada et al. ................. 501/104 |
| 5,712,211 A | * | 1/1998 | Park et al. .................. 501/104 |
| 5,994,250 A | * | 11/1999 | Suzuki et al. ............... 501/104 |

FOREIGN PATENT DOCUMENTS

| | | | |
|---|---|---|---|
| AU | 533896 | | 1/1979 |
| AU | B67957 | | 8/1987 |
| JP | 3-97670 | * | 4/1991 |
| WO | WO8304247 | | 12/1983 |

OTHER PUBLICATIONS

N. Claussen, "Microstructural Design of Zirconia–Toughened Ceramics (ZTC)", Advances in Ceramics, vol. 12, ©1984*No Month.

F. Meschke et al., "Microstructure and Thermal Stability of Fine–grained (Y,Mg) –PCZ Ceramics with Alumina Additions", Journal of the European Ceramic Society, 11 (1993)*No Month.

F. Meschke et al., "Preparation and Characterization of Fine–Grained (Mg, Y)–PSZ Ceramics with Spinel Additions", Sci. and Tech. of Zirconia V, ed., 1993 *No Month.

F. Meschke et al., "Phase Stability of Fine–Grained (Mg,Y) – PSZ", J. Am. Ceram. Soc., vol. 78, No. 7, 1995*No Month.

F. Meschke et al., "Preparation of High–Strength(Mg,Y)— Partially Stabilised Zirconia by Hot Isostatic Pressing", J. of the Euro. Ceram. Soc., vol. 17, 1997*No Month.

S.Q. Wang et al., "The Preparation and Microstructures of Micro–Grained PSZ (MSPSZ) Ceramics", Ceram. Int. Symp. Ceram. Mater. Compon. Engines, 5$^{th}$ (1995)*No Month.

* cited by examiner

*Primary Examiner*—Karl Group

(57) ABSTRACT

A high strength ceramic body and a method of making same are disclosed. The ceramic body is formed of ceramic composition containing 2.8–5.0% by weight MgO, an effective amount of grain growth inhibiting material, and the balance being essentially zirconia. The crystalline microstructure of the ceramic body comprises grains of cubic zirconia having an average grain size of less than about 30 microns in major dimension, 0.1–8.7% by volume of discrete particles of the grain growth inhibiting material, and precipitates of tetragonal zirconia having a substantially ellipsoidal shape with a long dimension of about 0.1–0.4 microns.

17 Claims, 1 Drawing Sheet

HIGH-STRENGTH MAGNESIA PARTIALLY STABILIZED ZIRCONIA

This application claims the benefit of priority of U.S. Provisional Application No. 60/117,250, filed Jan. 26, 1999.

FIELD OF THE INVENTION

The present invention relates to a ceramic body and a process for making the same. In particular, the present invention relates to a ceramic body formed of magnesia-partially-stabilized zirconia (Mg-PSZ) material having a unique combination of high strength, wear resistance, and corrosion resistance.

BACKGROUND OF THE INVENTION

The known Mg-PSZ materials are composed of zirconia with about 2.5–3.5% by weight magnesia, heated to form a single phase cubic zirconia, and then cooled in a controlled manner to develop a dispersion of tetragonal zirconia precipitates within the cubic grains. Much of the strength and toughness provided by the known Mg-PSZ materials results from the potential for stress induced martensitic transformation of the tetragonal precipitates to the monoclinic crystalline form when the material is stressed under load. Associated with the martensitic transformation is a volume expansion of those precipitates. When the material is placed under load, transformation occurs locally at sites of weakness, such as pre-existing cracks, pores, or other voids within the material which experience high stress intensity. The localized transformation zones reduce the stress levels experienced at the sites of weakness and thereby increase the strength of the material as a whole.

Despite this strengthening mechanism, one factor limiting the strength of the known Mg-PSZ materials is the large cubic zirconia grain size of those materials, typically between about 50 and 100 microns in major dimension. The cubic zirconia grains become enlarged because of the high processing temperatures used to achieve the single cubic solid solution phase from which the final microstructure is developed. The high processing temperatures result in high diffusion rates and, hence, rapid grain growth of the cubic phase.

Associated with the large cubic zirconia grains are large pores, voids, and other intrinsic microstructural flaws which limit the strength of the known Mg-PSZ materials. As a result, the known Mg-PSZ materials have been restricted in their use. For example, the known Mg-PSZ materials are unsuitable for some guide, bushing, and forming tool applications in the metals processing industry or for severe service valve components because the known materials are unable to provide the requisite combination of high strength, wear resistance, and corrosion resistance.

In light of the foregoing, it would be highly beneficial to provide a Mg-PSZ material, and articles formed therefrom, that have a significantly higher strength than the known Mg-PSZ materials. Further, the material should provide the high strength without adversely effecting the wear resistance and corrosion resistance of the material.

SUMMARY OF THE INVENTION

The property limitations associated with the known Mg-PSZ materials are overcome, to a large extent, by a ceramic body in accordance with the present invention. The present invention provides a ceramic body made from a Mg-PSZ material, and a process for producing the same, wherein a small volume fraction of a grain growth inhibiting material is added to a Mg-PSZ material in order to limit the grain boundary movement of the cubic zirconia phase. The volume fraction and particle size of the grain growth inhibiting material, as well as the method of introduction and heat treatment, are controlled to limit grain growth and thus provide higher strength than the known Mg-PSZ materials. More specifically, a ceramic body produced in accordance with the present invention provides a flexural strength that is significantly higher than that provided by the known Mg-PSZ materials.

In accordance with one aspect of the present invention, there is provided a ceramic body made from a ceramic powder composition containing about 2.8–5.0% by weight magnesia, an effective amount of a grain growth inhibiting material, and the balance essentially zirconia. The grain growth inhibiting material is selected to be insoluble and stable in the Mg-PSZ system at the high temperatures used during processing (1600° C. to 1850° C). Examples of suitable grain growth inhibiting materials are magnesium aluminate spinel ($MgAl_2O_4$), silicon carbide (SiC), and titanium carbide (TiC). Nitrides, borides, and other types of carbides should also be suitable as grain growth inhibiting agents.

The microstructure of the ceramic body comprises grains of cubic zirconia having an average grain size of less than about 30 microns in major dimension and 0.1–8.7% by volume of discrete particles of the grain growth inhibiting material. Preferably, the discrete particles of grain growth inhibiting material have an average size less than about 5 microns in major dimension and reside primarily at the grain boundaries of the cubic zirconia. However, a portion of the discrete particles may reside within the grains of cubic zirconia. In one embodiment, the grain growth inhibiting material comprises magnesium aluminate spinel ($MgAl_2O_4$).

Additionally, discrete precipitates of tetragonal zirconia are distributed within the grains of cubic zirconia. Preferably, the tetragonal precipitates have a substantially ellipsoidal shape with a long dimension of about 0.1–0.4 microns.

In another aspect, the present invention relates to a method of making a ceramic body. The method comprises the step of mixing a zirconia powder, a magnesia powder, and a grain growth inhibiting additive to form a homogeneous powder mixture. Alternatively, some or all of the magnesia powder can be replaced with a magnesium salt which decomposes upon heat treatment to form magnesia. In one embodiment, the additive powder comprises magnesium aluminate spinel. In an alternate embodiment, the additive powder comprises alumina which can react with some of the magnesia during subsequent processing to form magnesium aluminate spinel particles.

The homogeneous powder mixture is consolidated into a green body which is then fired in air to a temperature in the range of about 1600° C. to about 1850° C. to develop a substantially fully dense sintered body. When carbides, nitrides, or borides are used as the grain growth inhibiting agent, the firing is conducted in a nonoxidizing or reducing atmosphere.

During the firing step, the grain growth inhibiting particles restrain (pin) the movement of the zirconia grain boundaries. The firing step is conducted to a temperature and for a time sufficient to ensure that all, or nearly all, of the zirconia is in the cubic crystalline form without producing cubic grains having excessively large sizes.

The sintered body is then cooled at a controlled cooling rate to nucleate and grow tetragonal zirconia precipitates within the cubic zirconia grains of the body. In one embodiment, the sintered body is cooled from the maximum firing temperature to about 1400° C. at a rate in the range of about 100° C./hr to about 500° C./hr; from about 1400° C. to about 1200° C. at a rate in the range of about 40° C./hr to about 200° C./hr; and from about 1200° C. to below about 600° C. at a rate in the range of about 100° C./hr to about 300° C./hr. Once cooled, the ceramic body may be optionally heat treated at a temperature in the range of about 1000° C. to about 1500° C. to further develop its microstructure.

BRIEF DESCRIPTION OF THE DRAWINGS

The foregoing summary, as well as the following detailed description of the preferred embodiments of the present invention, will be better understood when read in conjunction with the accompanying drawing, in which.

DETAILED DESCRIPTION OF A PREFERRED EMBODIMENT

Figure 1:
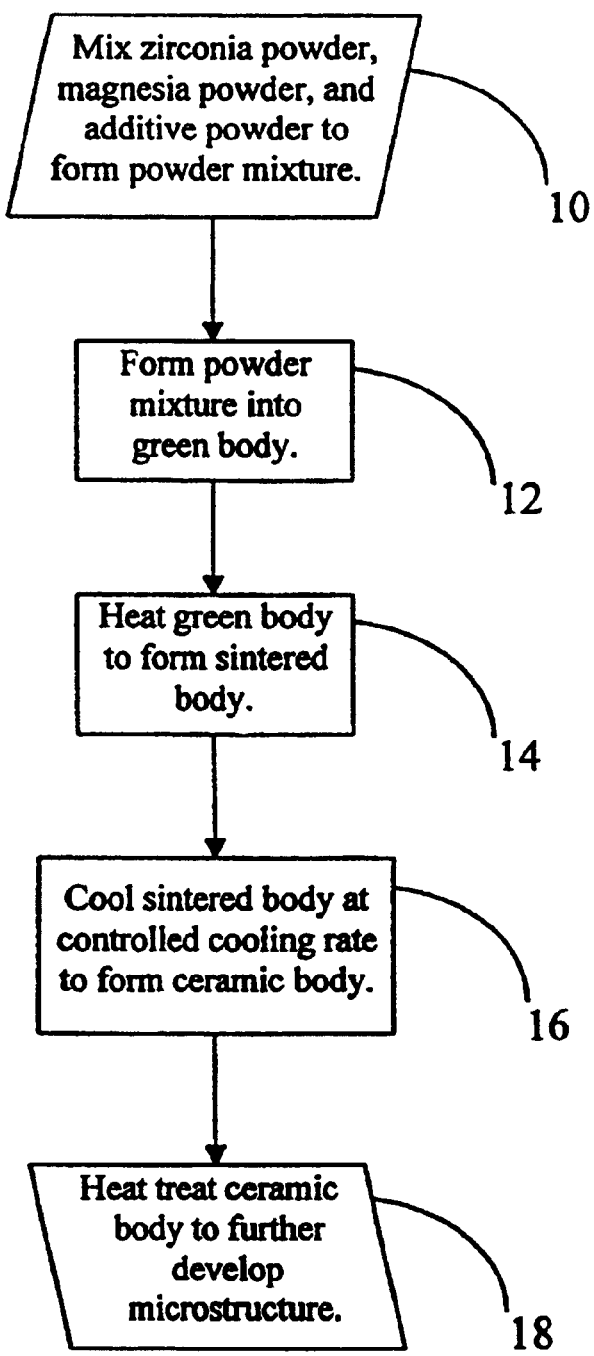
FIG. 1 is a flow chart showing the steps of a method for making a ceramic body in accordance with the present invention.

The present invention relates to a magnesia partially stabilized zirconia (Mg-PSZ) ceramic body. In one embodiment of the present invention, the ceramic body is formed from a ceramic powder composition which contains at least about 2.8 weight percent, and preferably at least about 3.0 weight percent magnesia (MgO), which is present in the ceramic powder composition to stabilize some of the zirconia as the cubic crystalline phase at room temperature. Too much MgO limits the formation of beneficial tetragonal precipitates. Accordingly, MgO is restricted to not more than about 5.0 weight percent, and preferably to not more than about 4.5 weight percent in the ceramic body made according to this invention.

At least about 0.05 weight percent, and preferably at least about 0.2 weight percent alumina ($Al_2O_3$) is present in the ceramic powder composition to react with some of the magnesia to form magnesium aluminate spinel ($MgAl_2O_4$). Too much alumina deleteriously affects the material by forming clusters of magnesium aluminate spinel particles which become sites of weakness in the material. Too much alumina will also deplete magnesia from the zirconia-matrix and thereby inhibit formation of the cubic zirconia phase during processing. Accordingly, alumina is restricted to not more than about 4.0 weight percent, and preferably to not more than about 2.5 weight percent in the starting powder composition.

A small amount of yttria ($Y_2O_3$), ceria ($CeO_2$), other rare earth oxide, or strontia (SrO) may be present in this material. In this regard, not more than about 0.5 mole %, better yet, not more than about 0.3 mole %, and preferably not more than about 0.1 mole percent of such oxides are present in this material. The balance of the ceramic composition is zirconia and minor amounts of other compounds which in low concentrations do not detract from the desired properties of the material according to this invention. Among such impurities may be oxides such as $SiO_2$, $Na_2O$, and $K_2O$, the total weight percent of which is typically less than about 0.5.

The present invention also relates to a method of making the ceramic body which will be described with reference to FIG. 1. At step 10, the zirconia powder, magnesia powder, and alumina powder are blended to form a homogeneous mixture. Some or all of the magnesia powder can be replaced with a magnesium salt which decomposes upon heat treatment to form magnesia.

The homogeneous mixture is then consolidated into a green body at step 12. The green body is preferably consolidated by pressing the mixture into a mold. The green body is then fired in step 14 to a temperature in the range of about 1600° C. to about 1850° C. to develop a sintered body. During the firing step, the alumina reacts with some of the magnesia to form magnesium aluminate spinel particles at the zirconia grain boundaries. The magnesium aluminate spinel particles restrain or pin the movement of the zirconia grain boundaries during the elevated temperature processing. The firing is continued to a temperature and for a time sufficient to ensure that all, or nearly all, of the zirconia is in the cubic crystalline form, without producing excessively large cubic grains. Preferably, the average cubic grain size is limited to not greater than about 30 microns in major dimension.

In step 16, the sintered body is cooled at a controlled cooling rate to nucleate and grow tetragonal zirconia precipitates of the required size within the cubic zirconia matrix. The sintered body is first cooled from the sintering temperature to about 1400° C. at a rate in the range of about 100° C./hr to about 500° C./hr. The sintered body is then cooled from about 1400° C. to about 1200° C. at a rate in the range of about 40° C./hr to about 200° C./hr. The sintered body is then cooled from about 1200° C. to below about 600° C. at a rate in the range of about 100° C./hr to about 300° C./hr.

Step 18 is an optional step in which the ceramic body is heat treated using a post-firing cycle. The post-firing cycle comprises heating the ceramic body to a temperature in the range of about 1000° C. to about 1500° C. to further develop the microstructure of the ceramic body.

The microstructure of the ceramic material according to the present invention includes a matrix of grains of cubic zirconia that are not greater than about 30 microns in major dimension. The microstructure also includes the magnesium aluminate spinel particles which are present as a secondary phase distributed within the microstructure. Although the magnesium aluminate spinel particles reside primarily at the cubic zirconia grain boundaries, some of the particles may be distributed within the cubic zirconia grains themselves. The constraining effect of the magnesium aluminate spinel particles during firing results in a Mg-PSZ ceramic with a finer grain size and, consequently, higher strength than the known Mg-PSZ materials. In order to obtain a microstructure wherein the grains of cubic zirconia have an average grain size of less than about 30 microns in major dimension, at least about 0.1 percent by volume, and preferably at least about 0.5 percent by volume, of magnesium aluminate spinel particles are present in the material. Too much magnesium aluminate spinel results in the formation of clusters of magnesium aluminate spinel particles which become sites of weakness in the material. Therefore, the magnesium aluminate spinel is restricted to not more than about 8.7 percent by volume, and preferably to not more than about 5.0 percent by volume. In addition, the discrete particles of the magnesium aluminate spinel preferably have an average size of less than about 5 microns in major dimension in order to effectively inhibit movement of the cubic zirconia grain boundaries.

The microstructure of the present invention further contains discrete precipitates of tetragonal zirconia within the cubic zirconia grains. Precipitates having a substantially ellipsoidal shape with a long dimension of about 0.1 to about 0.4 microns are particularly useful in benefitting the strength of the material. When the material is stressed under a load, the tetragonal precipitates undergo a martensitic transformation into a monoclinic crystalline form which benefits the strength of this material. The formation and benefits of such tetragonal precipitates in Mg-PSZ are described in U.S. Pat. Nos. 4,279,655 and 4,885,266, the specifications of which are incorporated herein by reference.

EXAMPLE

In order to demonstrate the properties provided by the material of the present invention, Examples 1 and 2 of the material of the present invention were prepared. The powder compositions of Examples 1 and 2 were measured by X-ray fluorescence (XRF) spectroscopy and are given in weight percent in Table 1. For comparative purposes, Samples A to C with compositions outside the range of the material according to the present invention were also tested. Their weight percent compositions were also determined by XRF and are also shown in Table 1. Samples A to C are representative of the highest strength, commercial Mg-PSZ materials currently available from Carpenter Advanced Ceramics Inc., Coors Ceramics Co., and Kyocera Industrial Ceramics Corp., respectively.

TABLE 1

|  | Example No. | | Comparative Sample No. | | |
|---|---|---|---|---|---|
|  | 1 | 2 | A | B | C |
| $SiO_2$ | <0.01 | <0.01 | .047 | .083 | .214 |
| MgO | 3.71 | 3.96 | 3.35 | 2.96 | 3.61 |
| $Al_2O_3$ | .98 | .98 | .014 | .006 | .022 |
| $Fe_2O_3$ | .003 | .007 | .019 | .019 | .028 |
| SrO | <.05 | <.05 | .277 | .003 | .006 |
| $ZrO_2$ | 93.3 | 93.0 | 95.24 | 95.82 | 94.48 |
| $HfO_2$† | 1.92 | 1.95 | 1.95 | 1.92 | 2.12 |
| $Y_2O_3$ | .13 | .13 | <.05 | <.05 | .13 |
| Other | <0.1 | <0.1 | <0.1 | <0.1 | <0.2 |

†Hafnium compounds occur naturally in zirconia ore deposits. Consequently, hafnia ($HfO_2$) is always present at low levels in zirconia chemically derived from such material.

Examples 1 and 2 were prepared by weighing out batches of high purity zirconia, alumina, yttria, and magnesium carbonate powders in proportions necessary to obtain approximately the chemical compositions shown in Table 1. The powder batches were wet attrition milled in deionized water with a dispersant to an average particle. size less than 1.0 microns in major dimension. An organic binder was added and the material was spray dried to free flowing powder batches by conventional ceramic processing methods. Each powder batch was preformed into a rectangular block about 6 mm×20 mm×80 mm in a uniaxial pressing die at a pressure of about 20 MPa and then cold isostatically pressed at 180 MPa to form a green compact.

In order to develop the microstructure required to provide the very high strength characteristic of the present invention, the green compacts of Examples 1 and 2 were fired. The firing cycle employed was as follows:

|  | Temperature (° C.) | Rate (C. °/hr) |
|---|---|---|
| Firing cycle: | Room temperature to 400 | 25 |
|  | 400 to 1700 | 50 |
|  | Hold at 1700 for 30 minutes |  |
|  | 1700 to 1400 | 200 |

-continued

| Temperature (° C.) | Rate (C. °/hr) |
|---|---|
| 1400 to 1200 | 100 |
| 1200 to room temperature | 200 |

After firing, Example 2 was heated to 1090° C. at a rate of 100° C./hr, held for 90 minutes at temperature, and then cooled to room temperature at a rate of 100° C./hr. Example 1 was not given any post-firing heat treatment.

The microstructures of Examples 1 and 2 and Samples A to C were evaluated by optical and scanning electron microscopy of polished cross sections to determine the average size of cubic zirconia grains and the volume fraction of magnesium aluminate spinel particles.

The method employed to evaluate the strength of Examples 1 and 2 and comparative Samples A to C is described below. First, bars about 4 mm×5 mm×40 mm were cut from the sintered rectangular blocks of each composition with a diamond impregnated slitting wheel. The bars were then ground to a cross section of 3.0 mm×4.0 mm±0.3 mm with a diamond resin bonded cup wheel rotating at 4100 rpm. The depth of cut for each pass was 0.025 mm, with the exception of the final two passes on each face which were made using a depth of only 0.012 mm. No other surface preparation was given to the bars. The bars were then subjected to flexural strength testing in a one-third, four point bend fixture with a major span of 20.0 mm at a cross head speed of 0.25 mm/minute. The maximum load at fracture and the bar cross sectional dimensions at the failure site were used to calculate the flexural strength. An average strength was then calculated for each material from at least six (6) test results. The average strength values determined are shown in Table 2.

TABLE 2

|  | Average Cubic Grain Size* ($\mu$m) | Estimated Volume Fraction Of $MgAl_2O_4$* (vol. %) | Average Flexural Strength (MPa)+ |
|---|---|---|---|
| Example 1 | 16 | 2.5 | 807(28) |
| Example 2 | 15 | 2.5 | 846(39) |
| Sample A | 45 | 0 | 700(48) |
| Sample B | 52 | 0 | 568(56) |
| Sample C | 36 | 0 | 654(30) |

+The numbers in parentheses indicate one standard deviation.
*Determined by the linear intercept method.

The data of Table 2 clearly show that Examples 1 and 2 of the present invention have a significantly higher average flexural strength than comparative Samples A to C.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A Mg-PSZ ceramic body formed from a ceramic powder composition consisting essentially of about 2.8–5.0% by weight MgO, an effective amount of a grain growth inhibiting additive, not more than about 0.3 mole % of yttria, ceria, other rare earth oxide, or strontia, and the balance being essentially zirconia, wherein said ceramic body has a crystalline microstructure comprising grains of cubic zirconia having an average grain size of less than about 30 microns in major dimension, discrete precipitates of tetragonal zirconia within the grains of cubic zirconia, and about 0.1–8.7% by volume of discrete particles of a grain growth inhibiting material which is or is formed from the grain growth inhibiting additive.

2. The ceramic body of claim 1 wherein the grain growth inhibiting material is an inorganic compound that is insoluble and stable in the Mg-PSZ at a temperature in the range of about 1600° C. to about 1850° C.

3. The ceramic body of claim 2 wherein the grain growth inhibiting material is selected from the group consisting of magnesium aluminate spinel, silicon carbide, titanium carbide, and mixtures thereof.

4. The ceramic body of claim 1 wherein the ceramic powder composition contains about 0.05–4.0% by weight alumina and wherein the discrete particles of the grain growth inhibiting material comprise discrete particles of magnesium aluminate spinel.

5. The ceramic body of claim 4 wherein at least a portion of the discrete particles of magnesium aluminate spinel reside at the grain boundaries of the cubic zirconia.

6. The ceramic body of claim 5 wherein a further portion of the discrete particles of magnesium aluminate spinel reside within the grains of cubic zirconia.

7. The ceramic body of claim 4 wherein the discrete particles of magnesium aluminate spinel have an average size of less than about 5 microns in major dimension.

8. The ceramic body of claim 1 wherein the discrete precipitates of tetragonal zirconia have a substantially ellipsoidal shape with a major dimension of about 0.1–0.4 microns.

9. The ceramic body set forth in any of claims 1 to 7, or 8 wherein the ceramic powder composition of contains about 3.0–4.5% by weight MgO and about 0.2–2.5% alumina.

10. The ceramic body set forth in claims 9 wherein the crystalline microstructure of the ceramic body comprises about 0.5–5.0% by volume of particles of magnesium aluminate spinel.

11. A ceramic body formed from a powder mixture consisting essentially of about 2.8–5.0% by weight magnesia, about 0.05–4.0% by weight alumina, not more than about 0.3 mole % yttria, ceria, other rare earth oxide, or strontia, and the balance essentially zirconia, wherein the ceramic body has a crystalline microstructure comprising:

grains of cubic zirconia having an average grain size of less than about 30 microns in major dimension;

1–8.7% by volume of particles of magnesium aluminate spinel residing at the boundaries of the cubic zirconia grains and having an average size of less than about 5 microns in major dimension; and precipitates of tetragonal zirconia formed within the grains of cubic zirconia, said tetragonal zirconia precipitates having a substantially ellipsoidal shape with a long dimension of about 0.1–0.4 microns.

12. A ceramic body as set forth in claim 11 wherein the ceramic powder mixture consists essentially of about 3.0–4.5% by weight MgO, about 0.2–2.5% alumina, and the balance is essentially zirconia.

13. The ceramic body set forth in claim 12 wherein the crystalline microstructure of the ceramic body comprises about 0.5–5.0% by volume of particles of magnesium aluminate spinel.

14. A method of making a ceramic body as set forth in claim 1 comprising the steps of:

a. mixing a zirconia powder, a magnesia powder, and a grain growth inhibiting additive to form a homogeneous powder mixture;

b. consolidating the homogeneous powder mixture to form a green body;

c. firing the green body at a maximum temperature in the range of about 1600° C. to about 1850° C. and for a time sufficient to form a polycrystalline cubic zirconia phase having particles of a grain growth inhibiting material residing at the grain boundaries of the cubic zirconia phase, the grain growth inhibiting material being or being formed from the grain growth inhibiting additive; and d. cooling the fired body at a controlled cooling rate to form the ceramic body, wherein said controlled cooling rate comprises:

i) cooling the fired body from the maximum firing temperature to about 1400° C. at a rate in the range of about 100° C./hr to about 500° C./hr;

ii) cooling the fired body from about 1400° C. to about 1200° C. at a rate in the range of about 40° C./hr to about 200° C./hr; and then iii) cooling the fired body from about 1200° C. to below about 600° C. at a rate in the range of about 100° C./hr to about 300° C./hr.

15. The method of claim 14 wherein the mixing step comprises the step of using as the grain growth inhibiting additive an inorganic compound that is insoluble and stable in the zirconia phase at a temperature in the range of about 1600° C. to about 1850° C.

16. The method of claim 14 wherein the mixing step comprises the step of using as the grain growth inhibiting additive a material selected from the group consisting of magnesium aluminate spinel, silicon carbide, titanium carbide, and mixtures thereof.

17. The method of claim 14 further comprising the step of heat treating the ceramic body at a temperature in the range of about 1000° C. to about 1500° C.

* * * * *